June 17, 1941. L. A. KILGORE 2,246,305
DAMPER WINDING
Filed Dec. 22, 1938

WITNESSES:
N. F. Susser
F. P. Lyle

INVENTOR
Lee A. Kilgore.
BY O. B. Buchanan
ATTORNEY

Patented June 17, 1941

UNITED STATES PATENT OFFICE 2,246,305

2,246,305

DAMPER WINDING

Lee A. Kilgore, Forest Hills, Pa., assignor to Westinghouse Electric & Manufacturing Company, East Pittsburgh, Pa., a corporation of Pennsylvania Application December 22, 1938, Serial No. 247,187

3 Claims. (Cl. 172—120)

The present invention relates to damper windings and, more particularly, to a special field damper winding for synchronous motors of relatively large size.

Synchronous motors are usually started with the direct current field winding deenergized, and the short-circuited damper winding in the pole faces acts as a squirrel-cage secondary to accelerate the motor up to speed as an induction motor. In most cases, when the motor is started in this way, it is necessary to short-circuit the field winding through a relatively low resistance during the greater part of the starting period in order to avoid the occurrence of dangerously high induced voltages in the field winding. The flux on the direct axis during the starting period, produced by the armature winding, cannot pass through this short-circuited field winding, however, because it is damped out by the eddy currents induced in the winding. This flux is, therefore, forced into the field leakage paths and a high armature current is required on the direct axis to force the flux through these leakage paths.

This effect has several very undesirable results. The inrush or starting current is increased and the power factor is decreased during the starting period. The induced current in the damper winding is also decreased, thus reducing the starting torque. In addition, the high armature current required to force the flux through the field leakage paths causes a difference in the current and power factor on the direct axis and on the quadrature axis of the motor during starting, and this difference on the two axes may react with the line resistance to cause a negative torque and thus produce a dip in the speed-torque curve at half speed, making it very difficult to accelerate the motor to synchronous speed.

The object of the present invention is to provide a special field damper winding which will reduce the starting current and increase the starting torque.

Another object is to provide a damper winding for synchronous motors of relatively large size which will make it possible to start the motor with the field winding open-circuited.

More specifically, the object is to provide a damper winding which will damp out a considerable part of the flux through the field winding, produced by the armature current during the starting period, and thus make it possible to have the field winding open-circuited during starting, thereby avoiding the excessive armature current, with its resulting undesirable effects, which occurs when the field winding is short-circuited.

These objects are attained by providing a short-circuited, low resistance winding around the base of each pole piece. This winding may take the form of a single short-circuited turn or collar about the base of the pole, or the lower part of the field winding may be brought out separately and short-circuited, or a plurality of bars may be placed on the rotor spider between the pole pieces and connected by short-circuiting rings to provide a short-circuited winding around each pole piece. The effect of this winding is to limit the amount of flux which may pass through the field winding by damping out a considerable part of it, and thus the flux is reduced so that the induced voltage in the field winding will not be dangerously high and the motor can be started with the field circuit open. Since the reactance of this damper winding will be very high, relative to the effective reactance of the field winding, the armature current necessary to force the flux through the leakage paths will be greatly reduced and the undesirable effects of a high armature current, described above, will be substantially eliminated.

The invention will be more fully understood from the following detailed description, taken in connection with the accompanying drawing, in which.

Figure 1:
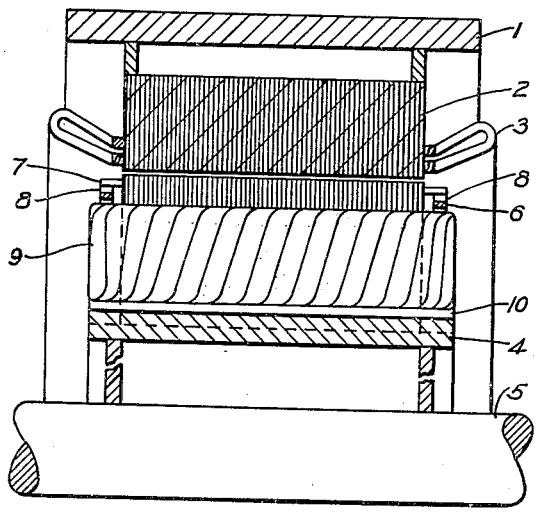
Figure 1 is a longitudinal sectional view through the upper half of a synchronous motor.

Fig. 1 shows, somewhat diagrammatically, a synchronous motor having a frame 1 on which is supported a laminated stator core 2 carrying suitable armature windings 3. A rotor spider 4 of any suitable type is secured to the shaft 5 and a plurality of salient pole pieces 6 are secured to the spider. A damper winding of any suitable or usual type is provided in the pole faces, and may consist of a plurality of damper bars 7 embedded in slots in the pole faces and connected by short-circuiting end rings 8. A direct current field winding 9 is placed on the body of the pole piece in the usual manner.

Figure 2:
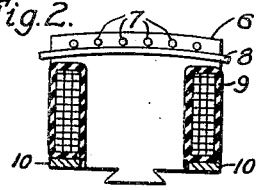
Fig. 2 is a transverse sectional view of a single pole piece.

In order to damp out a considerable portion of the flux through the field winding produced by the armature current during the starting period, a special damper winding is provided on each pole piece in addition to the usual damper winding in the pole face. This special damper consists of a short-circuited winding around the base of each pole piece underneath the field winding 9. As shown in Figs. 1 and 2, this winding may conveniently take the form of a single turn or collar 10 of thin copper strap or other suitable material of low resistance. The collar encircles the base of the pole piece next to the spider and underlies the field winding, as clearly shown in the drawing. Since the resistance of this copper collar will be quite low, it can be made relatively thin and will take up very little room so that ample space remains for the field winding.

Figure 3:
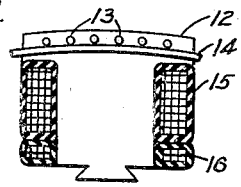
Fig. 3 is a transverse sectional view of a single pole piece showing a different embodiment of the invention.

Another embodiment of the invention is shown in Fig. 3 which shows a sectional view of a pole piece 12 having the usual damper winding, consisting of bars 13 in the pole face with short-circuiting rings 14, and a field winding 15. In this case, the special damper winding of the present invention is formed by winding the lower portion 16 of the field winding separately, and bringing out separate leads, which may be permanently short-circuited, but which are preferably brought out to separate collector rings on the shaft of the motor, so that this winding may be short-circuited during the starting period, either directly or through a low resistance. If desired, the winding 16 may be connected in series with the main field winding 15 after the motor has come up to speed and the field winding is energized with direct current.

Figure 4:
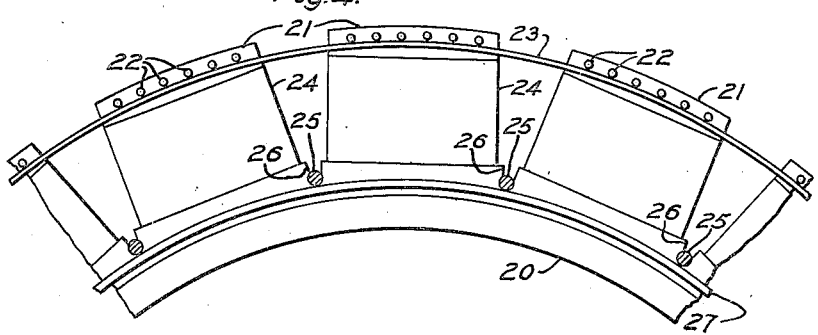
Fig. 4 is a fragmentary elevational view of the rotor of a synchronous motor, showing still another embodiment of the invention.

Still another embodiment of the invention is shown in Fig. 4, which is a fragmentary view showing a rotor spider 20 of any suitable type having a plurality of salient pole pieces 21 thereon. The usual damper winding is provided, consisting of bars 22 embedded in slots in the pole faces and connected by short-circuiting end rings 23 of any suitable type. Field windings 24 are placed on the pole pieces in the usual manner. The damper winding of the present invention comprises a plurality of bars 25 of copper or other low resistance material, one of which is placed between each adjacent pair of pole pieces. These bars may merely rest on the rotor spider, or they may be placed in slots 26 in the spider, as shown in the drawing. In order to complete the short-circuited winding about each pole piece, the ends of the bars 25 are connected by short-circuiting rings 27 which extend around the spider, and are secured to the bars by any suitable means, such as brazing.

It will be seen that in each of the embodiments of the invention described above, the special damper winding consists of a short-circuited, low resistance winding around the base of each of the pole pieces. The effect of this winding is to damp out a considerable portion of the magnetic flux through the field winding which is produced by the current in the stator winding during the starting period. This reduces the resultant flux through the field winding so that the induced voltage in this winding, when open-circuited during the starting period, is reduced to between ¼ and ½ of the voltage that would be produced without this damper winding. This makes it possible to start the motor with the field winding open-circuited, thus reducing the necessary armature current.

The reactance of this short-circuited winding around the base of the pole is very high, usually about 2 to 3 times the effective reactance of the field winding. For this reason, a much lower armature current is required to force the flux through the field leakage paths, so that the armature current during the starting period is still further reduced. This reduction in armature current results in substantially eliminating the undesirable effects of a large starting current, such as low power factor, decreased torque and the dip in the torque curve at half speed. By the use of this winding, therefore, it is possible to start a synchronous motor with the field winding open-circuited and to obtain a lower inrush or starting current for a given starting torque, or a higher torque for a given current.

It will be seen, therefore, that a special damper winding has been provided for synchronous motors of large size which effectively reduces the starting current and increases the starting torque, by making it possible to start the motor with the field winding open circuited, thus avoiding the undesirable effects resulting from a short-circuited field winding. The field winding may, of course, be sectionalized in the usual manner to still further reduce the induced voltage if necessary, and it may be short-circuited as the motor comes up to speed to get a higher pull-in torque.

It is to be understood that although certain specific embodiments of the invention have been illustrated and described, it is not limited to the exact constructional forms shown, but that, in its broadest aspects, it includes all equivalent modifications and embodiments which come within the scope of the appended claims.

I claim as my invention:

1. In a synchronous dynamo-electric machine, a rotor member comprising a supporting structure secured to a shaft, a plurality of salient pole pieces mounted on said supporting structure, direct-current field windings on the pole pieces, a damper winding consisting of a plurality of conducting bars positioned in the peripheral surfaces of each of the pole pieces and short-circuiting rings connecting all of said bars together, and a winding for damping a portion of the flux through the field winding during the starting period, said last-mentioned winding having a plurality of conducting bars positioned intermediate the pole pieces at the bases thereof and short-circuiting means connecting all of said last-mentioned bars together.

2. In a synchronous dynamo-electric machine, a rotor member comprising a supporting structure secured to a shaft, a plurality of salient pole pieces mounted on said supporting structure, direct-current field windings on the pole pieces, a damper winding consisting of a plurality of conducting bars positioned in the peripheral surfaces of each of the pole pieces and short-circuiting rings connecting all of said bars together, and a winding for damping a portion of the flux through the field winding during the starting period, said last-mentioned winding having a plurality of conducting bars positioned on said supporting structure in the spaces between the pole pieces and short-circuiting means connecting all of said last-mentioned bars together.

3. In a synchronous dynamo-electric machine, a rotor member comprising a supporting structure secured to a shaft, a plurality of salient pole pieces mounted on said supporting structure, direct-current field windings on the pole pieces, a damper winding consisting of a plurality of conducting bars positioned in the peripheral surfaces of each of the pole pieces and short-circuiting rings connecting all of said bars together, and a winding for damping a portion of the flux through the field winding during the starting period, said last-mentioned winding having a plurality of conducting bars placed in slots in said supporting structure in the spaces between the pole pieces and conducting end rings connecting all of said last-mentioned bars together.

LEE A. KILGORE.